(12) United States Patent
Jin et al.

(10) Patent No.: US 10,019,576 B1
(45) Date of Patent: Jul. 10, 2018

(54) SECURITY CONTROL SYSTEM FOR PROTECTION OF MULTI-CORE PROCESSORS

(71) Applicant: Intelligent Automation, Inc., Rockville, MD (US)

(72) Inventors: Guang Jin, Germantown, MD (US); Hongmei Deng, Potomac, MD (US); Brandon James Knapp, Rockville, MD (US); Andrew William Henderson, Camillus, NY (US); Joshua Brandon Tuttle, Silver Spring, MD (US); Renato Levy, N. Potomac, MD (US)

(73) Assignee: Intelligent Automation, Inc., Rockville, MD (US)

( * ) Notice: Subject to any disclaimer, the term of this patent is extended or adjusted under 35 U.S.C. 154(b) by 291 days.

(21) Appl. No.: 15/088,665

(22) Filed: Apr. 1, 2016

Related U.S. Application Data

(60) Provisional application No. 62/143,511, filed on Apr. 6, 2015.

(51) Int. Cl.
*G06F 21/56* (2013.01)

(52) U.S. Cl.
CPC .................. *G06F 21/566* (2013.01)

(58) Field of Classification Search
CPC ............. H04L 63/1416; H04L 63/1408; H04L 63/1441; H04L 63/1458; G06F 21/552

USPC ............................................................ 726/23
See application file for complete search history.

(56) References Cited

U.S. PATENT DOCUMENTS

| | | | |
|---|---|---|---|
| 8,572,404 B2 | 10/2013 | Markham et al. | |
| 2004/0153794 A1* | 8/2004 | Velazco | G06F 11/2215 714/27 |
| 2005/0201195 A1* | 9/2005 | Dirscherl | G06F 9/30054 365/189.08 |
| 2014/0089617 A1* | 3/2014 | Polzin | G06F 12/14 711/163 |

FOREIGN PATENT DOCUMENTS

| | | |
|---|---|---|
| WO | WO 2013/019369 A1 | 2/2013 |
| WO | WO 2014/021919 A2 | 2/2014 |

* cited by examiner

*Primary Examiner* — Evans Desrosiers
(74) *Attorney, Agent, or Firm* — Faegre Baker Daniels LLP

(57) ABSTRACT

A security control system is provided that works as an extra layer of defense as a way to prevent an "attack" that is initiated by modifying either the "jump" or the "return" addresses or both. The principal behind the security control system is to "monitor" the addresses to which the processors would jump, interrupt or return, and identify when these addresses are modified in a manner that does not comply with the normal execution of the processor. In order to do that the security control system uses existing structures in multi-core processors and even anticipates the creation of additional structures to expedite and improve such control.

18 Claims, 1 Drawing Sheet

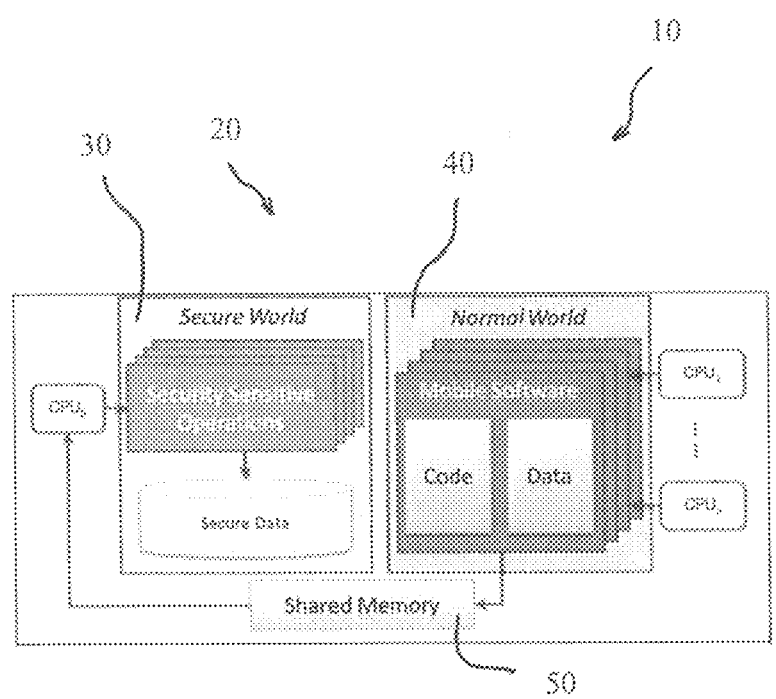

SECURITY CONTROL SYSTEM FOR PROTECTION OF MULTI-CORE PROCESSORS

This application claims priority to provisional patent application 62/143,511 filed on Apr. 6, 2015, the complete disclosure of which is incorporated in its entirety herein by reference.

This invention was made with Government support under contract number FA8750-13-C-0112 awarded by the Air Force Research Lab. The Government has certain rights in the invention.

BACKGROUND OF THE INVENTION

This invention relates to a security control system to thwart malware, and in particular, to a security control system for protecting multi-core processors from malware.

Malware subverts normal program execution and gains control of a computer, sometimes even with escalation of priority (i.e., becoming root).

Any computer program needs two types of memory segments (i.e., the code and data segments) for its execution. The code segment holds the instructions to direct a processor's computation, while the data segments keep the interim computation results to carry on the program's execution. Cyber-attacks tamper both the code and data segments to subvert computer systems. Computer viruses are a well-known example, which often modify a victim program's code segment and inserts a malicious code to the victim program. Existing solutions, such as memory write protection, code signing, and anti-virus software, provide methods to preserve the integrity of the code segment. Attackers, however, can still subvert a normal program's execution by tampering with only the data segment.

In normal execution, a processor will fetch an instruction, and while the instruction is being executed, the processor will fetch the next instruction from the address immediately after. From time to time, normal program execution forces the program to "jump" to another address altogether and continue from this point. Besides that, execution can be deviated by "calling a subroutine", a process in which the processor saves the returning address of the next instruction before jumping to execute elsewhere. At the end of the subroutine, the processor "returns" by retrieving the address that was stored before. A similar process to this one is used to perform "interrupts". An interrupt is a way to tell the processor that it has to do something else before it continues its execution. In that case, the return address is also stored before the interrupt is served, but in this case, the address to jump is not present on the instruction, since the instruction being executed does not necessarily know an interrupt must be served. In this case, the address that "serves" the interrupt is stored in a table.

A common manner in which malware subverts this normal operation, is by replacing the return address for subroutines or by replacing the service address on interrupts. The return addresses for subroutines are stored on the "stack", a structure in memory that holds the return address, the subroutine parameters, and the local variables of the subroutine to be executed. The fact that the variables are stored at the same structure as the return address creates the famous buffer overflow problem, where the hackers can modify the return address by "writing" beyond the variables reserved space. Reaching the service space of the interrupt is a bit more complicated, since many of the required instructions are protected but there are equivalent "clever" ways to overcome these defenses.

These are not the only way to perform the "attack", only an example of the methods, but all the methods reside on thwarting the mechanisms by modifying either the "jump" or the "return" addresses (sometimes both).

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawing, wherein:

FIG. 1 is a schematic diagram of an architecture associated with the subject invention.

Corresponding reference characters indicate corresponding parts as set forth in the specification. Although the drawing represents an embodiment of the present invention, the drawing is not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiment(s) illustrated in the drawing, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

A security control system, generally indicated as 10, of the subject invention works as an extra layer of defense as a way to prevent an "attack" that is initiated by modifying either the "jump" or the "return" addresses or both.

The principal behind the security control system is to "monitor" the addresses to which the processors would jump, interrupt or return, and identify when these addresses are modified in a manner that does not comply with the normal execution of the processor. In order to do that the security control system uses existing structures in multi-core processors and even anticipates the creation of additional structures to expedite and improve such control.

Multi-core processors are well known and the likelihood of progress in the field is to increase the number of cores. The security control system dedicates a control structure, easily implemented with one of the cores, to the security of execution of the other cores. Cores not involved in the security control system can be considered "worker cores." In this sense, one of the cores, which can be specialized for this task, monitors the "jump", "interrupt", and "return" addresses on all other cores, and promotes a security "halt" of any core that tries to violate the valid execution path. In one embodiment, the invention utilizes an existing processor and structures, but the invention pertains to the method to perform the validation of the execution path, in any multi-core architectures.

In one embodiment, a dedicated structure or one of the cores in a multi-core processor is utilized to monitor execution in the other cores. This dedicated structure or security control system is implemented with one of the existing cores in the processor. The cores not involved in the control structures or worker cores can be used normally by Commercial off-the Shelf (COTS) Operating System and applications.

Another feature of the subject invention is that the security control can be programmed only at boot time. Additionally, the memory space between the security control and worker cores is well separated and isolated from each other. The security control system can be implemented on, but is not limited to, a hardware, which provides the isolated memory space for the security control. Both software-based and hardware-based methods can help to achieve this.

In one embodiment, no other core can start until the security control is operational. The security control has access into the memory space of the worker cores, and no other core can access the memory space of the security control, or use it to reach the memory space of other cores. The worker cores can have independent or unified virtual memory registers, and the code area and data area are separated in memory for the worker cores. This is known as Harvard architecture. The Harvard architecture can be implemented by hardware or enforced via software barriers at the secure core.

The security control can interrupt, disable, pause, and restart any worker core.

The operating system cannot access the security control. It must only execute at the worker cores, and the interrupt vectors of the security control can only be programmed at boot time. The security control has access to the interrupt vectors of all the worker cores.

When a worker core executes an operation that changes the execution path (changes PC besides simple and automatic increment), it interrupts the security control and stalls until the "jump" is validated by the security control.

Referring to FIG. 1, in one embodiment, security control system 10 is implemented onto a hardware platform, generally indicated as 20, with an ARM's TrustZone. ARM's TrustZone provides a System on a Chip (SoC) solution to separate the code execution in a single physical processor core into two worlds, i.e., a "Secure World" 30 and a "Normal World" 40. ARM's TrustZone provides an isolated and tamper-resistant execution environment for security components. Thus, security control system 10 can be implemented as a core dedicated to run inside the secure world 30, where ARM's TrustZone separates and isolates the security control's memory space and resources from the worker cores.

Typically, the Security Monitor Call (SMC) command is used to switch the world and processing states in ARM's TrustZone. The SMC-based world switching takes a few hundreds microsecond and are commonly used to implement code integrity checkup mechanisms. The slow world-switching is not appropriate to implement integrity checkup mechanisms for dynamic data segment like stack and heap.

The security control systems architecture of a dedicated security control provides an effective and efficient way to preserve the integrity of the dynamic data segment. FIG. 1 shows the architecture of security control system 10 when implemented in a multi-core ARM processor. Here, the security control is dedicated to run in the ARM's TrustZone 30, and the worker cores, run in the normal world 40 and are fully utilized by the COTS OS and applications. In addition, security control system 10 uses a built-in fast speed shared memory 50 to enable extreme fast communication between worlds. In such a way, no expensive context switching incurred by the SMC command is necessary in this security control system embodiment. The security control system can constantly monitor and protect the normal world 40, while the worker cores can execute normally.

This is a significant change from the manner the ARM's TrustZone was intended to be used, but demonstrates how to implement the security control system technology on an existing processor.

Applications of security control system 10 include providing integrity protection on stack. The security control system maintains a copy of the stack addresses as used by each worker core. An automatic instrumentation engine may be used to insert instructions on stack operations, and vulnerable stack operations from the normal world are trapped into the Secure World and get analyzed by the security control. The instructions on stack operations may also be done in hardware or through other techniques. Once the normal world's stack is compromised, the security control detects the inconsistency between the normal world's stack with the duplicated stack in the Secure World. Further alerts can be generated by the security control and transmitted to authorities via a secure channel;

The security control system can also provide integrity protection on system calls. System calls are used for OS kernels to provide services to user applications, system calls can be used by an attacker to compromise user applications. The normal world's 40 OS kernel are modified to trap system calls (with their context) into the Secure World 30, where the security control performs system call analysis when a user application is newly installed and loaded in the normal world 40. A set of security policies are generated through the analysis and stored in the Secure World. The system call integrity is verified by the security control system 10, and the security control system compares the trapped system calls (and their context) with the pre-defined security policies. The security control system can generate further alerts to authorities through a secure channel.

Another aspect of the subject invention is providing Integrity protection on information flow. Normal world's 40 memory pages are marked with labels, such as colors, and the normal world's applications are modified to trap memory operations (with their context) into the Secure World 30. The security control system 10 analyzes the memory operations trapped from the normal world 40, and maintains an information flow graph of the normal world's 40 applications. The security control system maintains a set of security policies defining the permissible flows and forbidden information flows, and if the security control detects a forbidden information flow, an alert is generated.

While the invention has been taught with specific reference to these embodiments, one skilled in the art will recognize that changes can be made in form and detail without departing from the spirit and scope of the invention. The described embodiments are to be considered, therefore, in all respects only as illustrative and not restrictive. As such, the scope of the invention is indicated by the following claims rather than by the description.

The invention claimed is:

1. A security control system for protection of computer systems from Malware by validation of the execution path, comprising:

a hardware platform including a normal world and a secure world;

a plurality of worker cores located in said normal world, said worker core performing normal operations and applications of a computer system; and at least one secure processor core located in said secure world, said secure processor core located in an isolated and tamper-resistant execution environment, said secure processor core maintaining a duplicate copy of stack addresses used by each worker core, wherein the stack addresses include "jump", "interrupt", and "return" addresses; wherein when a worker core executes an operation that changes the execution path, the operation interrupts the security control system, causing a stall until the "jump" is validated by the security control system, and providing an alert when said secure processor core detects an inconsistency between the normal worker cores stack addresses and the duplicate stack addresses in the secure world.

2. The security control system for protection of computer systems from malware as set forth in claim 1, wherein said secure processor core is a dedicated structure provided for the security control system.

3. The security control system for protection of computer systems from malware as set forth in claim 1, wherein said secure processor core is one of a plurality of core's in a multi-core processor, said one core being utilized to monitor execution of the other cores.

4. The security control system for protection of computer systems from malware as set forth in claim 1, wherein the security control system can only be programmed at boot time.

5. The security control system for protection of computer systems from malware as set forth in claim 4, wherein no worker core can start until the security control system is operational.

6. The security control system for protection of computer systems from malware as set forth in claim 5, wherein the security control system can interrupt, disable, pause, and restart any worker core.

7. The security control system for protection of computer systems from malware as set forth in claim 6, wherein the security control system has access to interrupt vectors of all worker cores.

8. A method for protecting a multi-core processor computer system from malware by validation of the execution path, including the steps of:
providing a hardware platform with a security control system with a normal world and a secure world;
providing a plurality of worker cores in the normal world, each having a memory space;
providing a secure processor core in the secure world, said secure processor core having a memory space; providing security control access into the memory space of said at least one worker core, but no worker core can access the memory space of the secure processor core or reach the memory space of any other cores;
providing a duplicate copy of "jump", "interrupt", and "return" stack addresses used by each worker core in said secure processor core;
said secure core processor monitoring said at least one worker core's stack addresses with the copies duplicated in the secure world; and
said security control system generating an alert via a secure channel when detecting an inconsistency between the stack addresses in the normal world and the copied addresses in the secure world.

9. The method for protecting a multi-core processor computer system from malware by validation of the execution path as set forth in claim 8, wherein the multi-core processor is an advanced RISC machines (ARM) processor.

10. The method for protecting a multi-core processor computer system from malware by validation of the execution path as set forth in claim 9, including the step of providing built-in fast speed shared memory to enable fast communication between worlds.

11. The method for protecting a multi-core processor computer system from malware by validation of the execution path as set forth in claim 10, including the step of the security control system performing system call analysis when a user application is newly installed and loaded in the normal world.

12. The method for protecting a multi-core processor computer system from malware by validation of the execution path as set forth in claim 11, including the step of verifying integrity of a system call by the security control system, and comparing trapped system calls and the call context with pre-defined security policies.

13. The method for protecting a multi-core processor computer system from malware by validation of the execution path as set forth in claim 12, including the step of generating further alerts to authorities through a secure channel when a trapped system call violates pre-defined security policies.

14. The method for protecting a multi-core processor computer system from malware by validation of the execution path as set forth in claim 8,
further including the steps of marking memory pages with labels, such as colors, and modifying applications of the normal world to trap memory operations and associated context into the secure world.

15. The method for protecting a multi-core processor computer system from malware by validation of the execution path as set forth in claim 14, including the steps of the security control system analyzing memory operations trapped from the normal world, and maintaining an information flow graph of applications in the normal world.

16. The method for protecting a multi-core processor computer system from malware by validation of the execution path as set forth in claim 8, including the steps of the security control system maintaining a set of security policies defining permissible flows and forbidden information flows, and generating an alert if the security control system detects a forbidden information flow.

17. The method for protecting a multi-core processor computer system from malware by validation of the execution path as set forth in claim 8, including the step of programming the security control system at boot time.

18. The method for protecting a multi-core processor computer system from malware by validation of the execution path as set forth in claim 17, wherein no worker core can start until the security control system is operational.

* * * * *